US008032360B2

(12) United States Patent
Chen

(10) Patent No.: US 8,032,360 B2
(45) Date of Patent: Oct. 4, 2011

(54) SYSTEM AND METHOD FOR HIGH-QUALITY VARIABLE SPEED PLAYBACK OF AUDIO-VISUAL MEDIA

(75) Inventor: Juin-Hwey Chen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1025 days.

(21) Appl. No.: 10/844,534

(22) Filed: May 13, 2004

(65) Prior Publication Data

US 2005/0254783 A1 Nov. 17, 2005

(51) Int. Cl.
G10L 11/00 (2006.01)
G10L 19/14 (2006.01)
G10L 13/06 (2006.01)
G10L 21/00 (2006.01)
G06F 15/00 (2006.01)

(52) U.S. Cl. ......... 704/211; 704/200; 704/267; 704/278
(58) Field of Classification Search .................... 386/68, 386/75; 704/211, 278, 200, 267
See application file for complete search history.

(56) References Cited

U.S. PATENT DOCUMENTS

| 4,689,697 | A | * | 8/1987 | Wilkinson | 386/75 |
| 4,866,543 | A | * | 9/1989 | Cooper et al. | 360/15 |
| 5,233,439 | A | * | 8/1993 | Utsumi | 386/75 |
| 5,583,652 | A | * | 12/1996 | Ware | 386/75 |
| 5,684,804 | A | * | 11/1997 | Baronetti et al. | 370/509 |
| 5,781,696 | A | * | 7/1998 | Oh et al. | 704/270 |
| 5,845,247 | A | * | 12/1998 | Miyasaka | 704/267 |
| 5,956,674 | A | * | 9/1999 | Smyth et al. | 704/200.1 |
| 6,011,663 | A | * | 1/2000 | Inoue et al. | 360/48 |
| 6,122,619 | A | * | 9/2000 | Kolluru et al. | 704/500 |
| 6,215,526 | B1 | * | 4/2001 | Barton et al. | 348/473 |
| 6,334,023 | B1 | * | 12/2001 | Bruls | 386/54 |
| 6,842,735 | B1 | * | 1/2005 | Covell et al. | 704/503 |
| 6,850,692 | B1 | * | 2/2005 | Eckart | 386/69 |
| 6,982,377 | B2 | * | 1/2006 | Sakurai et al. | 84/654 |
| 7,136,571 | B1 | * | 11/2006 | Dagtas | 386/68 |
| 7,239,999 | B2 | * | 7/2007 | Rhee | 704/211 |
| 7,283,965 | B1 | * | 10/2007 | Michener | 704/500 |
| 2002/0165721 | A1 | * | 11/2002 | Chang | 704/503 |

FOREIGN PATENT DOCUMENTS

| CN | 1404691 | | 4/2002 |
| CN | 1359231 | A | 7/2002 |

OTHER PUBLICATIONS

Amir et al., "Using Audio Time Scale Modification for Video Browsing", Proc. of the 33$^{rd}$ Hawaii International Conf. on Systems Sciences, IEEE, 2000.*

* cited by examiner

*Primary Examiner* — Eric Yen
(74) *Attorney, Agent, or Firm* — Sterne, Kessler, Goldstein & Fox, P.L.L.C.

(57) ABSTRACT

A system and method for high-quality variable speed playback of audio-visual (A/V) media is provided. The system receives an encoded visual signal and an encoded audio signal. The encoded visual signal is decoded to generate a decoded visual signal and the encoded audio signal is decoded to generate a decoded audio signal. The decoded audio signal is time scale modified to generate a time scale modified audio signal. The decoded visual signal and the time scale modified audio signal are then synchronized for playback at a predefined playback speed. Only partial decoding of the encoded audio signal may be performed to conserve processing power.

12 Claims, 4 Drawing Sheets

A Conventional A/V Playback System During Normal Speed Playback

A Conventional A/V Playback System During Fast or Slow Playback

SYSTEM AND METHOD FOR HIGH-QUALITY VARIABLE SPEED PLAYBACK OF AUDIO-VISUAL MEDIA

BACKGROUND OF THE INVENTION

1. Field of the Invention

The present invention relates generally to the decoding and playback of audio-visual (A/V) media.

2. Background

Conventional systems for playing audio-visual (AV) media include analog systems, such as video cassette recorders (VCRs), and digital systems, such as DVD players, personal video recorders (PVRs), set-top boxes, and personal computers (PCs). Many of these conventional systems include functionality that permits a user to play back the visual component of the A/V media in a fast forward or slow motion mode. During these modes of operation, the audio component is typically turned off entirely. In other words, during a fast forward or slow motion mode, the user is permitted to view the visual component at an accelerated or decelerated rate, but is not permitted to hear the audio component at all. This is undesirable from the user standpoint, since the user may be interested in hearing the audio component of the A/V media during fast or slow playback.

This concept will now be illustrated with reference to FIGS. 1 and 2. FIG. 1 is a functional block diagram 100 showing how a conventional system for playback of A/V media operates to achieve playback at a normal speed. As used in this context, "normal" indicates that the A/V media is not being played back in a fast forward or slow motion mode. FIG. 2 is a functional block diagram 200 showing how the conventional system operates during a fast forward or slow motion mode. Both FIG. 1 and FIG. 2 are intended to be generic in that they describe both analog and digital systems, as well as systems for processing both single channel audio signals as well as multi-channel audio signals.

As shown in FIG. 1, playback at normal speed involves functional blocks 102, 104, 106 and 108. At block 102, the conventional system receives an encoded A/V signal and splits it into an encoded visual signal and an encoded audio signal. At block 104, the conventional system decodes the encoded visual signal at normal speed to generate a decoded visual signal. At block 106, the conventional system decodes the encoded audio signal at normal speed to generate a decoded audio signal. At block 108, the conventional system synchronizes the decoded visual and audio signals with each other and finally plays them back at normal speed.

As shown in FIG. 2, fast or slow playback only involves functional blocks 202, 204, and 206. At block 202, the conventional system receives the encoded A/V signal and extracts an encoded visual signal from it. At block 204, the conventional system decodes the encoded visual signal at a speed factor X, where X is a predefined multiplier of the normal decode/playback rate. Where fast playback is desired, X will be greater than 1, and where slow playback is desired, X will be less than 1. Thus, for example, where X=0.5 playback will be slowed down by a factor of 2 and where X=2 playback is sped up by a factor of 2. At block 206, the conventional system then plays back the decoded visual signal at the desired speed factor X.

As shown by FIG. 2, fast forward or slow motion playback in a conventional system typically provides no audio playback whatsoever. This may be because in a fast forward mode, the rate at which data must be decoded is increased relative to the speed of the fast forward function. Thus, if playback is accelerated by a factor of two, then the rate at which the visual and audio data must be decoded is doubled, if playback is accelerated by a factor of three then the rate at which visual and audio data must be decoded is tripled, and so forth. Consequently, additional processing power must be available to meet these increased decoding demands. Where the audio signal is multi-channel encoded audio, such as Dolby Digital (AC-3) or MPEG multi-channel audio, the system must include significant additional processing power to perform accelerated processing of all of the audio channels. These increased demands for processing power result in an increase in the cost required to implement a system for playing A/V media.

Another difficulty that may arise in attempting to enable audio playback during a fast forward or slow motion mode is synchronizing the audio signal with the visual signal while still achieving high-quality audio playback. For example, simply speeding up or slowing down playback of the audio component to match the speed of the visual component will affect the timbre and pitch of the audio, such that human speech will have a high-pitched "chipmunk"-like quality in a fast forward mode or a low-pitched "sleepy giant"-like quality in a slow motion mode.

It would be beneficial, then, to provide a system for playing A/V media in which the audio component can be played along with the visual component during a fast forward or slow motion mode. It would be further beneficial to provide such a system wherein the audio component played during the fast forward or slow motion mode is of a high quality, such that the timbre and pitch of human speech is not changed. It would be still further beneficial to provide such a system wherein the processing power required for decoding and otherwise processing the audio signal during the fast forward mode or slow motion is minimized, and ideally does not exceed the processing power required for processing the audio signal at a normal playback speed.

BRIEF SUMMARY OF THE INVENTION

The present invention relates to a system and method for high quality variable speed playback of A/V media. An embodiment of the present invention permits an audio component of A/V media to be played along with a visual component of the A/V media during a fast forward or slow motion mode. In an embodiment, time scale modification is used to ensure that the audio component played during the fast forward or slow motion mode is of a high quality. In a further embodiment, only partial decoding of an encoded audio signal is performed to minimize the processing power required for decoding and otherwise processing the audio signal during the fast forward or slow motion mode. In a still further embodiment, the processing power required for decoding and otherwise processing the audio signal during the fast forward or slow motion mode does not exceed that required for processing the audio signal at normal playback speed.

In particular, an embodiment of the present invention provides a method for processing A/V media for playback at a predefined playback speed. In accordance with this method, an encoded visual signal is received and an encoded audio signal is received. The encoded audio signal includes information corresponding to a plurality of audio channels. The encoded visual signal is decoded to generate a decoded visual signal. The encoded audio signal is decoded to generate a decoded audio signal, wherein decoding the encoded audio signal includes decoding information in the encoded audio signal corresponding to only a subset of the plurality of audio channels. The decoded audio signal is then time scale modified to generate a time scale modified audio signal. Finally, the decoded visual signal and the time scale modified audio signal are synchronized for playback at the predefined playback speed.

In an alternate embodiment of the present invention, a method for processing A/V media for playback at a predefined playback speed is provided. In accordance with this method, an encoded visual signal is received and an encoded audio signal is received. The encoded audio signal includes information corresponding to a plurality of frequency components. The encoded visual signal is decoded to generate a decoded visual signal. The encoded audio signal is decoded to generate a decoded audio signal, wherein decoding the encoded audio signal includes decoding information in the encoded audio signal corresponding to only a subset of the plurality of frequency components. The decoded audio signal is then time scale modified to generate a time scale modified audio signal. Finally, the decoded visual signal and the time scale modified audio signal are synchronized for playback at the predefined playback speed.

In a further alternate embodiment of the present invention, a method for processing A/V media for playback at a predefined playback speed is provided. In accordance with this method, an encoded visual signal is received and an encoded audio signal is received. The encoded visual signal is decoded to generate a decoded visual signal. The encoded audio signal is decoded to generate a decoded audio signal. The decoded audio signal is then time scale modified to generate a time scale modified audio signal. Finally, the decoded visual signal and the time scale modified audio signal are synchronized for playback at the predefined playback speed.

In a still further alternate embodiment of the present invention, a method for processing A/V media for playback at a predefined playback speed is provided. In accordance with this method, an encoded visual signal is received and an encoded audio signal is received. The encoded visual signal is decoded to generate a decoded visual signal. The encoded audio signal is decoded and time scale modified to generate a time scale modified audio signal. Finally, the decoded visual signal and the time scale modified audio signal are synchronized for playback at the predefined playback speed.

An embodiment of the present invention also provides a system for processing A/V media for playback at a predefined playback speed. The system includes means for receiving an encoded visual signal and means for receiving an encoded audio signal. The encoded audio signal includes information corresponding to a plurality of audio channels. The system also includes means for decoding the encoded visual signal to generate a decoded visual signal and means for decoding the encoded audio signal to generate a decoded audio signal, wherein the means for decoding the encoded audio signal includes means for decoding information in the audio signal corresponding to only a subset of the plurality of audio channels. The system further includes means for time scale modifying the decoded audio signal to generate a time scale modified audio signal and means for synchronizing the decoded visual signal and the time scale modified audio signal for playback at the predefined playback speed.

An alternate embodiment of the present invention also provides a system for processing A/V media for playback at a predefined playback speed. The system includes means for receiving an encoded visual signal and means for receiving an encoded audio signal, the encoded audio signal including information corresponding to a plurality of frequency components. The system also includes means for decoding the encoded visual signal to generate a decoded visual signal and means for decoding the encoded audio signal to generate a decoded audio signal, wherein the means for decoding the encoded audio signal includes means for decoding information in the encoded audio signal corresponding to only a subset of the plurality of frequency components. The system further includes means for time scale modifying the decoded audio signal to generate a time scale modified audio signal and means for synchronizing the decoded visual signal and the time scale modified audio signal for playback at the predefined playback speed.

A further alternate embodiment of the present invention also provides a system for processing A/V media for playback at a predefined playback speed. The system includes means for receiving an encoded visual signal and means for receiving an encoded audio signal. The system also includes means for decoding the encoded visual signal to generate a decoded visual signal and means for decoding the encoded audio signal to generate a decoded audio signal. The system further includes means for time scale modifying the decoded audio signal to generate a time scale modified audio signal and means for synchronizing the decoded visual signal and the time scale modified audio signal for playback at the predefined speed.

A still further alternate embodiment of the present invention also provides a system for processing A/V media for playback at a predefined playback speed. The system includes means for receiving an encoded visual signal and means for receiving an encoded audio signal. The system also includes means for decoding the encoded visual signal to generate a decoded visual signal and means for decoding and time scale modifying the encoded audio signal to generate a time scale modified audio signal. The system further includes means for synchronizing the decoded visual signal and the time scale modified audio signal for playback at the predefined speed.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWING/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements

DETAILED DESCRIPTION OF THE INVENTION

Figure 1:
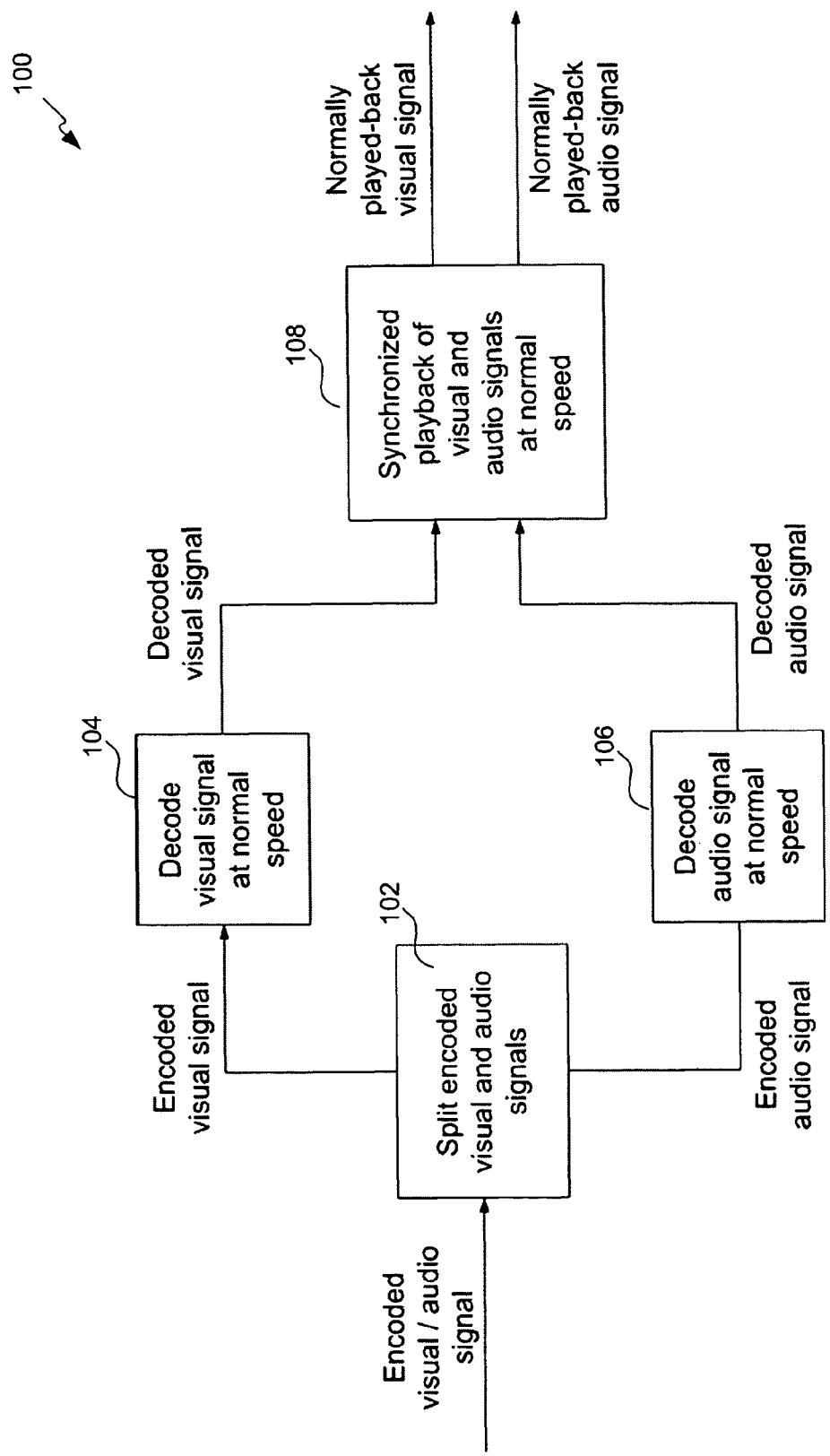
FIG. 1 is a functional block diagram showing how a conventional system for playback of A/V media operates to achieve playback at a normal speed.
Figure 2:
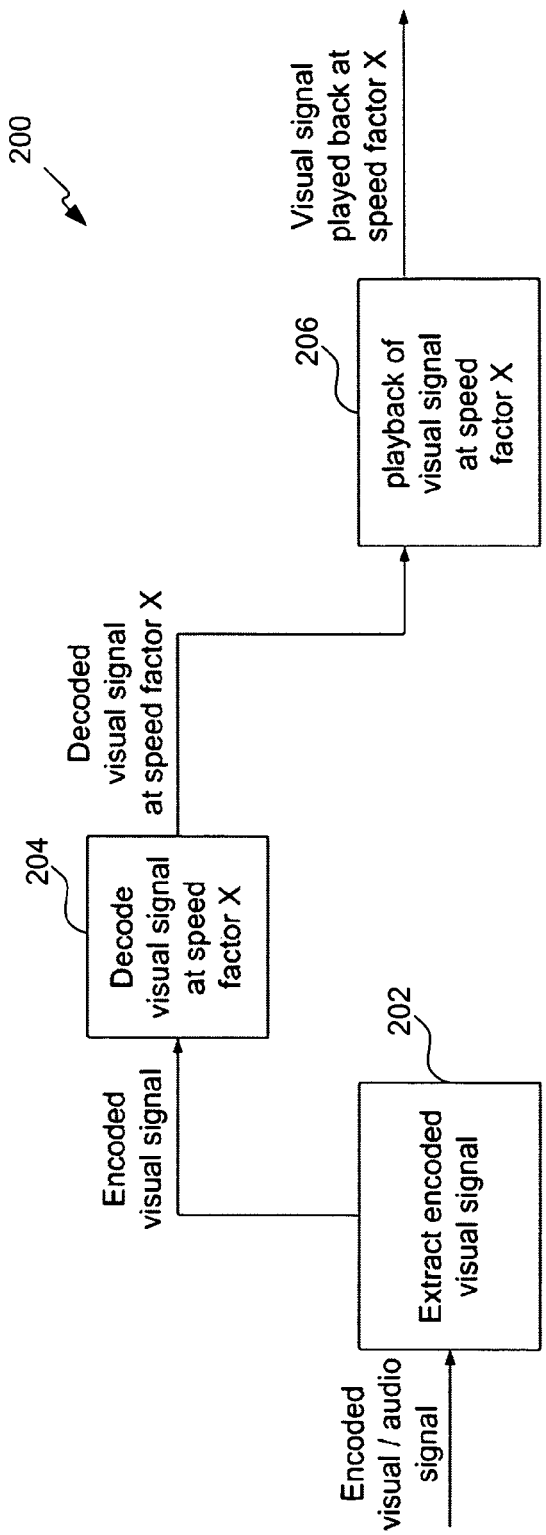
FIG. 2 is a functional block diagram showing how a conventional system for playback of A/V media operates during a fast forward or slow motion mode.
Figure 3:
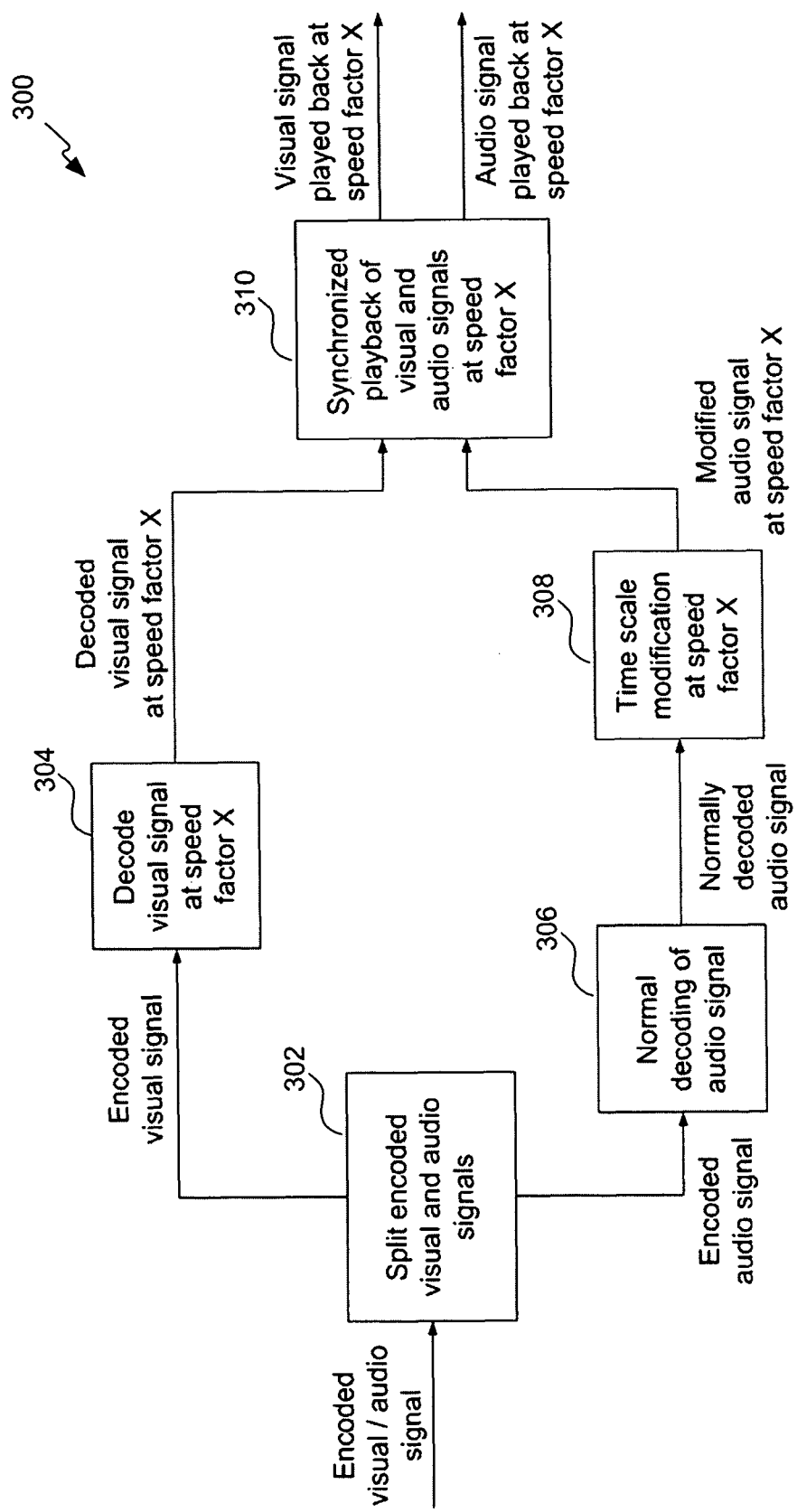
FIG. 3 is a functional block diagram of a system for playback of A/V media in a fast forward or slow motion mode in accordance with a first embodiment of the present invention.

A. Fast Forward/Slow Motion Playback of A/V Media in Accordance with an Embodiment of the Present Invention FIG. 3 is a functional block diagram 300 of a system for playback of A/V media in a fast forward or slow motion mode in accordance with a first embodiment of the present invention. As will be appreciated by persons skilled in the relevant art(s) based on the teachings provided herein, each of the functional blocks of diagram 300 may be readily implemented in hardware, software, or a combination of hardware and software. It should also be noted that the arrangement and definition of the functional blocks of diagram 300 are intended to convey a concept and are not intended to limit the invention to a particular implementation. The embodiment described in reference to FIG. 3 may be implemented as part of any device or apparatus that operates to play A/V media, including but not limited to a VCR, DVD player, PVR, set-top box, or personal computer.

As shown in FIG. 3, processing begins at block 302, in which the system receives an encoded A/V signal and splits it into an encoded visual signal and an encoded audio signal. The encoded A/V signal may be read from a local storage medium, such as a VHS tape, a DVD, or a hard disk drive, or may be received from a remote location via a network, such as a cable and/or fiber-optic broadband communications network.

At block 304, the system decodes the encoded visual signal at a speed factor X, where X is a predefined multiplier of the normal decode/playback rate, to generate a decoded visual signal at speed factor X. Where fast playback is desired, X will be greater than 1, and where slow playback is desired, X will be less than 1. Techniques for decoding an encoded visual signal for fast or slow playback are well known in the art, and any suitable technique may be used to implement the functionality of block 304. For example, in some techniques for processing an encoded visual signal for fast playback, visual frames are dropped. As a further example, in some techniques for processing an encoded visual signal for slow playback, the same number of visual frames are decoded for playback, but they are played back for a longer period of time. However, it should be noted that the invention is not limited to any particular technique for decoding an encoded visual signal for fast or slow playback.

At block 306, the system performs normal decoding of the encoded audio signal. As used in this context, "normal" means that decoding of the encoded audio signal is performed in the same manner as if normal speed playback of the A/V media were desired (i.e., not fast forward or slow motion playback).

In accordance with embodiments of the present invention, the encoded audio signal may comprise either an analog signal or a digital signal. The encoded audio signal may also comprise a single ("mono") channel audio signal or a multi-channel audio signal. An example of a single channel audio format that may be supported in accordance with an embodiment of the present invention includes, but is not limited to, VHS video tape with mono audio. Examples of multi-channel audio formats that may be supported in accordance with an embodiment of the present invention include but are not limited to VHS video tape with hi-fi stereo, DOLBY SURROUND, DOLBY DIGITAL 5.1, DOLBY DIGITAL EX, DTS DIGITAL SURROUND, DTS ES 6.1, or MPEG multi-channel audio.

At step 308, the system performs time scale modification of the normally decoded audio signal to adapt the audio signal for playback at speed factor X. Time scale modification refers to any of a variety of techniques for altering the duration of an audio signal while retaining the signal's local frequency content. The goal of time scale modification is the speeding up or slowing down of the perceived playback rate of a recorded audio signal without noticeably affecting the timbre, pitch, or naturalness of the original signal. There are a wide variety of known time scale modification techniques, and the selection of an appropriate algorithm for a given implementation will be a matter of design choice. It should be noted that the present invention is not limited to any particular time scale modification technique.

At step 310, after time scale modification is performed, the system synchronizes the decoded visual signal and the time scale modified audio signal and plays them back at speed factor X. Thus, in accordance with an embodiment of the present invention, a user viewing A/V media in a fast forward or slow motion will also be able to hear a high quality, time scale modified version of the audio signal that is synchronized to the accelerated or decelerated playback of the visual signal.

By playing a time scale modified audio component during fast forward or slow motion mode, the above-described embodiment of the present invention provides a significant advantage over conventional systems for playback of A/V media, which typically omit playback of the audio component entirely during these modes of operation. It should be noted, however, that the embodiment described with reference FIG. 3 will likely require additional processing power as compared to conventional systems to decode and time scale modify the audio signal during a fast forward or slow motion playback mode. This requirement for increased processing power translates to an increase in the cost required to implement the system for playing A/V media.

Figure 4:
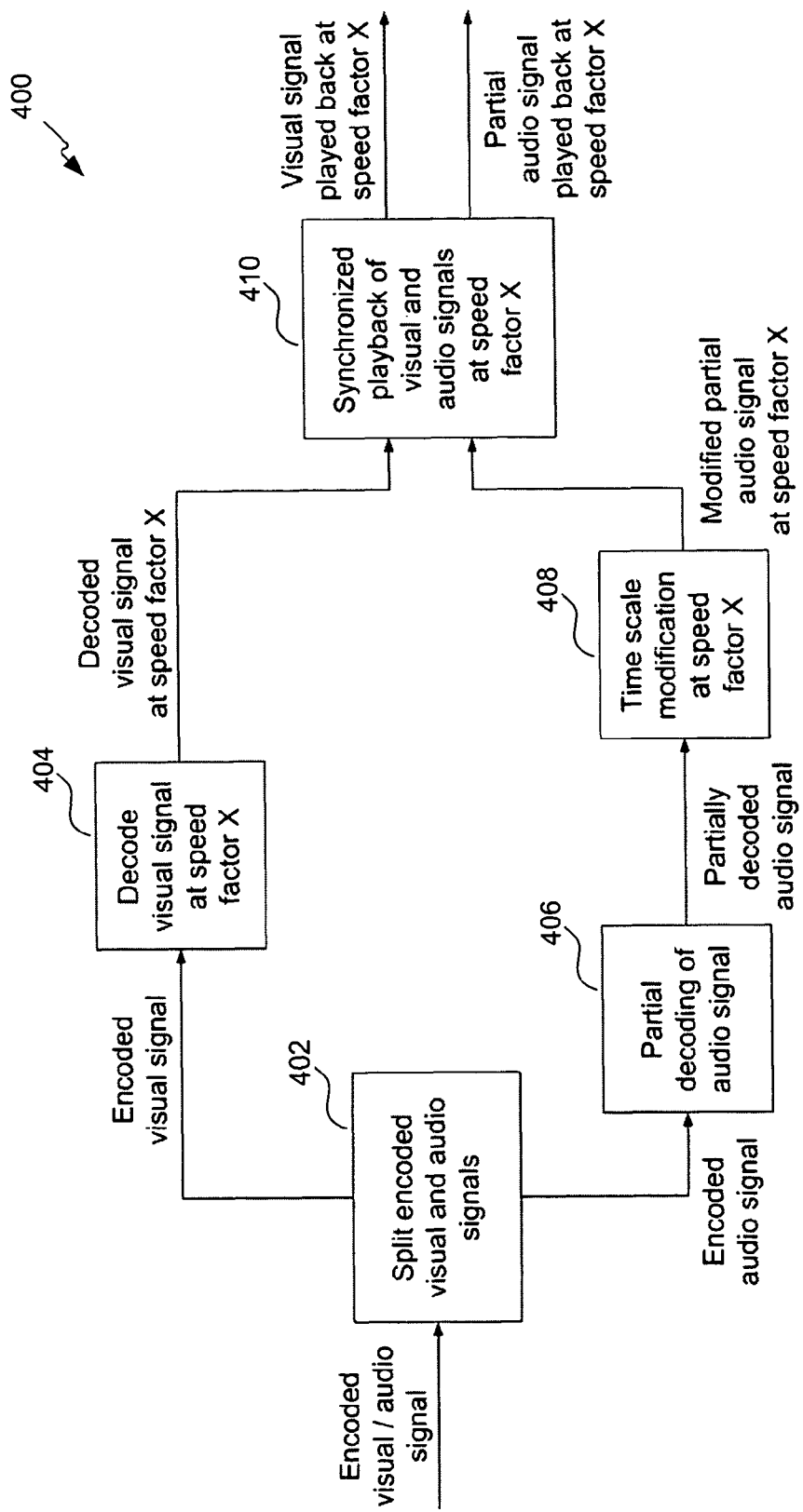
FIG. 4 is a functional block diagram of a system for playback of A/V media in a fast forward or slow motion mode in accordance with a second embodiment of the present invention.

B. Fast Forward/Slow Motion Playback of A/V Media Using Partial Audio Decoding in Accordance with an Embodiment of the Present Invention FIG. 4 is a functional block diagram 400 of a system for playback of A/V media in a fast forward or slow motion mode in accordance with a second embodiment of the present invention. This second embodiment is intended to minimize the processing power required for decoding and otherwise processing the audio signal during the fast forward or slow motion mode. In fact, this embodiment may be used to minimize the processing power required for processing of the audio signal during the fast forward or slow motion mode such that the required processing power does not exceed that required for audio decoding at a normal playback speed. As will be described in more detail below, the embodiment of FIG. 4 conserves processing power by decoding only a portion of the encoded audio signal.

As will be appreciated by persons skilled in the relevant art(s) based on the teachings provided herein, each of the functional blocks of diagram 400 may be readily implemented in hardware, software, or a combination of hardware and software. It should also be noted that the arrangement and definition of the functional blocks of diagram 400 are intended to convey a concept and are not intended to limit the invention to a particular implementation. The embodiment described in reference to FIG. 4 may be implemented as part of any device or apparatus that operates to play A/V media, including but not limited to a VCR, DVD player, PVR, set-top box, or personal computer.

As shown in FIG. 4, processing begins at block 402, in which the system receives an encoded A/V signal and splits it into an encoded visual signal and an encoded audio signal. At block 404, the system decodes the encoded visual signal at a speed factor X, where X is a predefined multiplier of the normal decode/playback rate, to generate a decoded visual signal at speed factor X. Where fast playback is desired, X will be greater than 1, and where slow playback is desired, X will be less than 1. Techniques for decoding an encoded visual signal for fast or slow playback are well known in the art, and any suitable technique may be used to implement the functionality of block 404. It should be noted that the invention is not limited to any particular technique for decoding an encoded visual signal for fast or slow playback.

At step 406, the encoded audio signal is only partially decoded. In accordance with embodiments of the present invention, partial decoding may include: (1) partial channel decoding, wherein only a subset of a plurality of channels in a multi-channel encoded audio signal is decoded; (2) partial bandwidth decoding, wherein only a subset of a plurality of frequency components in an encoded audio signal is decoded; or (3) partial channel/bandwidth decoding, wherein only a subset of a plurality of channels in a multi-channel encoded audio signal is decoded and only a subset of frequency components within each of those channels is decoded. However, these examples are not intended to be limiting and the invention may include other methods for partially decoding the encoded audio signal.

Partial channel decoding takes advantage of the fact that although multiple channels of audio are provided, only a subset of those channels need to be decoded to provide the user with adequate audio playback during fast forward or slow motion mode. Thus, for example, where the encoded audio signal is a Dolby Digital 5.0 signal having five total channels of audio, only two channels of audio might be decoded for playback purposes during a fast forward or slow motion mode. For example, only the front right and left channels might be decoded. Although the user will not hear the full five channels of audio during fast or slow playback, he or she is still permitted to hear the audio component, while significant processing power is conserved by decoding only a subset of the audio channels.

For example, it is anticipated that decoding only two channels of a five-channel audio signal in a 2× fast forward mode would require a level of processing power similar to that required for decoding four audio channels in a normal playback mode. This means that, in a system with sufficient processing power to decode five audio channels in a normal playback mode, processing power equivalent to that used for decoding one audio channel will actually be conserved during a 2× fast forward mode. This conserved processing power can be used to time scale modify the partially decoded audio signal, as will be discussed in more detail below.

As a further example, only one channel of a five-channel audio signal may be decoded in a 4× fast forward mode. For example, only the center channel might be decoded. It is anticipated that, in a system with sufficient processing power to decode five audio channels in a normal playback mode, this would also conserve processing power equivalent to that used for decoding one audio channel in a system. Again, this conserved processing power can be used to time scale modify the partially decoded audio signal.

Partial bandwidth decoding takes advantage of the fact that many conventional audio encoders process the entire spectrum of the audio signal (roughly 20 Hz to 20 KHz) using a frequency domain method that transforms the signal into the frequency domain and then encodes the transformed signal into a plurality of different frequency components. However, only a subset of these frequency components need to be decoded to provide the user with adequate audio playback during fast forward or slow motion mode. For example, instead of decoding all frequency components from 20 Hz to 20 KHz, an embodiment of the present invention decodes only frequency components below 10 KHz and ignores anything above 10 KHz. It is anticipated that the perceptual impact to a user of omitting frequency components above 10 KHz would be minimal; however, significant processing power may be conserved. Thus, in accordance with an exemplary embodiment of the present invention, only baseband or lowband frequency components of an encoded audio signal are decoded for playback purposes during a fast forward or slow motion mode.

Partial channel/bandwidth decoding combines both partial channel decoding and partial bandwidth decoding to achieve an even greater savings in processing power. In accordance with partial channel/bandwidth decoding, only a subset of a plurality of channels in a multi-channel encoded audio signal is decoded, and then only a subset of a plurality of frequency components within each of those channels is decoded.

In an embodiment, the number of channels and/or frequency components of the encoded audio signal that are decoded is dependent on the desired playback rate. For example, in an embodiment, more channels and/or frequency components are decoded in a 2× fast forward mode than in a 4× fast forward mode. This example is premised on the fact that decoding an audio signal in a 2× fast forward mode will require less processing power than decoding the audio signal in a 4× fast forward mode. Therefore, more processing power will be available in the 2× fast forward mode for decoding additional channels and/or frequency components.

After the encoded audio signal has been partially decoded, the system performs time scale modification of the partially decoded audio signal at the speed factor X, as shown at step 408. As discussed above in reference to FIG. 3, time scale modification refers to any of a variety of techniques for altering the duration of an audio signal while retaining the signal's local frequency content, with the goal of speeding up or slowing down the perceived playback rate of a recorded audio signal without noticeably affecting the timbre, pitch, or naturalness of the original signal. There are a wide variety of known time scale modification techniques, and the selection of an appropriate algorithm for a given implementation will be a matter of design choice. It should be noted that the present invention is not limited to any particular time scale modification technique.

In accordance with an embodiment of the present invention, because processing power is conserved by partial decoding of the encoded audio signal, the combined processing power required to perform partial decoding and time scale modification of the audio signal in a slow motion or fast forward mode can actually be less than or equal to the processing power required to perform full decoding of the encoded audio signal in a normal playback mode.

At step 410, after time scale modification of the partially decoded audio signal is performed, the system synchronizes the decoded visual signal and the time scale modified audio signal and plays them back at speed factor X. Thus, in accordance with an embodiment of the present invention, a user viewing A/V media in a fast forward or slow motion will also be able to hear a high quality, time scale modified version of the audio signal that is synchronized to the accelerated or decelerated playback of the visual signal. However, significant processing power is conserved by performing only partial decoding of the encoded audio signal. This allows the manufacturer of systems for playing A/V media to keep the processing power requirement, and thus the cost, at the same level as required for normal full channel, full bandwidth decoding.

C. Miscellaneous Design Considerations

The above-described embodiments utilize time scale modification to adapt a normal or partially decoded audio signal for fast or slow playback. Time scale modification is deemed preferable to other methods that could be used because it produces a high quality audio output. For example, a method for adapting the decoded audio signal for fast forward playback might consist of periodically dropping audio frames (e.g., decoding only every other frame of the audio signal). However, it is anticipated that such a method will result in very poor quality audio, since the audio signal is typically not encoded in a manner for which such frame loss can be compensated. As a further example, a method for adapting the decoded audio signal for slow motion playback might consist of repeating audio frames. However, it is anticipated that such a method would also result in very poor quality audio. Moreover, as noted above in the Background Section, simply speeding up or slowing down playback of the audio component to match the speed of the visual component will affect the timbre and pitch of the audio, such that human speech will have a high-pitched "chipmunk"-like quality in a fast forward mode or a low-pitched "sleepy giant"-like quality in a slow motion mode.

If processing power constraints are present even with the use of partial decoding, a low complexity time scale modification algorithm may be used. As noted above, a wide variety of time scale modification algorithms are known to persons skilled in the relevant art(s).

Most conventional time scale modification techniques are implemented using digital signal processing. However, as noted above, the embodiments described in reference to FIG. 3 and FIG. 4 are applicable to both analog systems, such as VCRs, and digital systems, such as DVD players. Thus, where the system is analog and digital signal processing is used to implement time scale modification, it is assumed that an analog-to-digital conversion function is performed in the audio processing path prior to time scale modification. For example, the A/D conversion may be implemented as part of the decoding function or as a separate operation entirely, although the difference is largely conceptual.

In an embodiment in which a fast forward function has been applied to the analog signal source, digitizing the analog audio signal will result in a digital audio signal having a sampling rate that is greater than the "normal" (1×) rate. Assuming that the time scale modification algorithm expects as input a digital audio signal having a normal rate, it may be necessary to change the sampling rate prior to application of time scale modification.

This may be achieved in a number of ways. In one embodiment, the A/D conversion function samples the audio signal at an increased sampling rate and then the digitized signal is treated as if it has a normal sampling rate. For example, assume that the normal sampling rate for digital audio is 48 KHz, but that a 2× fast forward function has been applied. In an embodiment, during the A/D conversion the analog signal is digitized at a sampling rate of 96 KHz, but after it is digitized the audio signal is treated as if it is a 48 KHz signal. As a result, it will finish playing back in twice the time, thus reverting the 2× speed of the analog signal back to the normal 1× speed in the digitized domain before feeding it to the time scale modification algorithm. If speed up at a factor of 1.5 is desired, then a sampling rate of 48 KHz multiplied by 1.5, or 72 KHz, can be used to digitize the analog audio signal.

In an alternate embodiment, the A/D conversion function samples the audio signal at the normal sampling rate and then the digitized signal is treated as if it has a different sampling rate depending on the actual playback speed. Thus, for example, during the A/D conversion the analog signal may be digitized at 48 KHz (the normal sampling rate), but it is then treated as if it is a 24 KHz sample signal for a 2× fast forward function or a 32 KHz sample signal for a 1.5× fast forward function. For 2× slow motion, the analog signal may be digitized at 48 KHz and then treated as if it is a 96 KHz sample signal.

A further consideration will be discussed with reference to the audio processing path depicted in the embodiments of FIGS. 3 and 4. In those embodiments, the decoding function and the time scale modification function are shown as separate operations for conceptual clarity. However, in certain implementations, these functions may be combined into a single operation.

A classical model for speech is termed the "vocoder model." In accordance with this model, voiced speech, which comprises the vowel sounds, appear as a periodic waveform in the time domain wherein the period is known as the pitch, or the pitch period. The inverse of the pitch period is the pitch frequency. Unvoiced speech appears as random noise, but spectrally shaped. Unvoiced speech can be approximated very well by passing white noise through some filter to have some spectral peaks and valleys. Additionally, there are some transitional segments.

Time scale modification operates to alter the duration of an audio signal while preserving the local frequency content of the signal. How time scale modification is achieved may vary from technique to technique but, in most cases, if pitch is to be preserved then the periodicity of the voice vowel waveform cannot be changed. For example, assume a 100 millisecond (ms) speech signal includes ten pitch cycles of a certain vowel sound. If one wished to playback the signal at 2× fast forward, five pitch cycles might be discarded with the remaining five pitch cycles having the same cycle length and pitch frequency.

As for unvoiced speech, this may be modeled as white noise passing through a filter where the filter may be changing. Assuming one wanted to speed up unvoiced speech by a factor of 2, one could make the filter characteristic change twice as fast (i.e., in half the time) and still maintain the noise excitation.

In the embodiments described in reference to FIGS. 3 and 4, decoding and time scale modification of the audio signal are described as separate operational steps. However, based on the foregoing principles, the two steps may be combined into a single step while still remaining within the scope and spirit of the present invention.

For example, assume that a 2× fast forward functionality is desired and that the encoded audio signal is a simple pulse code modulation (PCM) signal wherein every digital sample is represented by a codeword that is filter-independent to every other codeword. In such a system, the decoding and time scale modification steps can be easily combined into one operation. For example, to perform a 2× fast forward function, ever other cycle of voiced speech can be skipped during decoding. So if the voiced speech is eight cycles long, skipping every other cycle during decoding will result in a voiced speech signal that is four cycles long and a factor of two faster. For unvoiced speech, a certain amount of samples can be skipped every so often during decoding and then the remaining portions can be concatenated together. Alternatively, in order to slow down the signal by a factor of two, every pitch cycle may be repeated during the decoding step, or snippets of the voice waveform may be repeated.

Thus, as illustrated above, in accordance with an embodiment of the present invention, the decoding and time scale modification of an audio signal may be combined into a single operational step.

D. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for processing audio-visual media for playback at a predefined playback speed, comprising:
    receiving an encoded visual signal;
    receiving an encoded audio signal, said encoded audio signal comprising information corresponding to a plurality of audio channels;
    decoding said encoded visual signal to generate a decoded visual signal;
    decoding only information corresponding to only a subset of said plurality of audio channels to generate a decoded audio signal, wherein the number of channels in said subset of said plurality of audio channels is based on the predefined playback speed;
    time scale modifying said decoded audio signal to generate a time scale modified audio signal; and
    synchronizing said decoded visual signal and said time scale modified audio signal for playback at the predefined playback speed.

2. The method of claim 1, further comprising:
    receiving a combined encoded audio-visual signal; and
    splitting said combined encoded audio-visual signal into said encoded visual signal and said encoded audio signal.

3. The method of claim 1, wherein said encoded visual and audio signals are digital signals.

4. The method of claim 1, wherein said encoded visual and audio signals are analog signals.

5. The method of claim 4, further comprising converting said encoded audio signal from an analog signal to a digital signal.

6. The method of claim 1, wherein said information corresponding to a plurality of audio channels comprises information corresponding to a plurality of frequency components for each of said plurality of audio channels, and wherein said decoding information corresponding to only a subset of said plurality of audio channels to generate a decoded audio signal comprises decoding information corresponding to only a subset of said plurality of frequency components for each of said subset of said plurality of audio channels.

7. A system for processing audio-visual media for playback at a predefined playback speed, comprising:
    means for receiving an encoded visual signal;
    means for receiving an encoded audio signal, said encoded audio signal comprising information corresponding to a plurality of audio channels;
    means for decoding said encoded visual signal to generate a decoded visual signal;
    means for decoding only information corresponding to only a subset of said plurality of audio channels to generate a decoded audio signal, wherein the number of channels in said subset of said plurality of audio channels is based on the predefined playback speed;
    means for time scale modifying said decoded audio signal to generate a time scale modified audio signal; and
    means for synchronizing said decoded visual signal and said time scale modified audio signal for playback at the predefined playback speed.

8. The system of claim 7, farther comprising:
    means for receiving a combined encoded audio-visual signal; and
    means for splitting said combined encoded audio-visual signal into said encoded visual signal and said encoded audio signal.

9. The system of claim 7, wherein said encoded visual and audio signals are digital signals.

10. The system of claim 7, wherein said encoded visual and audio signals are analog signals.

11. The system of claim 10, further comprising means for converting said encoded audio signal from an analog signal to a digital signal.

12. The system of claim 7, wherein said information corresponding to a plurality of audio channels comprises information corresponding to a plurality of frequency components for each of said plurality of audio channels, and wherein said means for decoding information corresponding to only a subset of said plurality of audio channels to generate a decoded audio signal comprises means for decoding information corresponding to only a subset of said plurality of frequency components for each of said subset of said plurality of audio channels.

* * * * *